March 1, 1966 R. S. FARR ETAL 3,237,386
DUST SEPARATING DEVICE
Original Filed Aug. 12, 1960 3 Sheets-Sheet 1

INVENTORS
RICHARD S. FARR
PAUL A. LABADIE
BY
ATTORNEYS

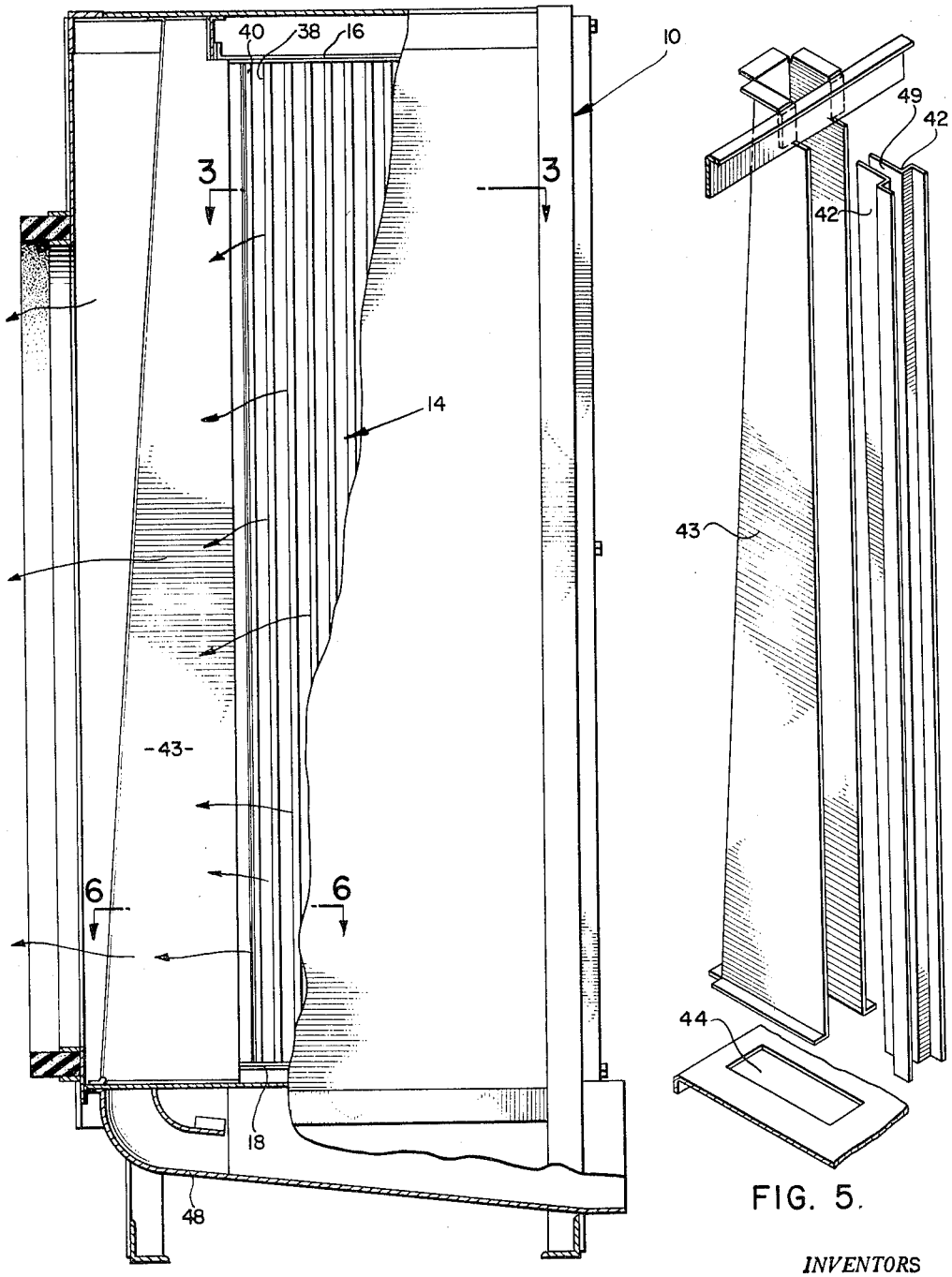

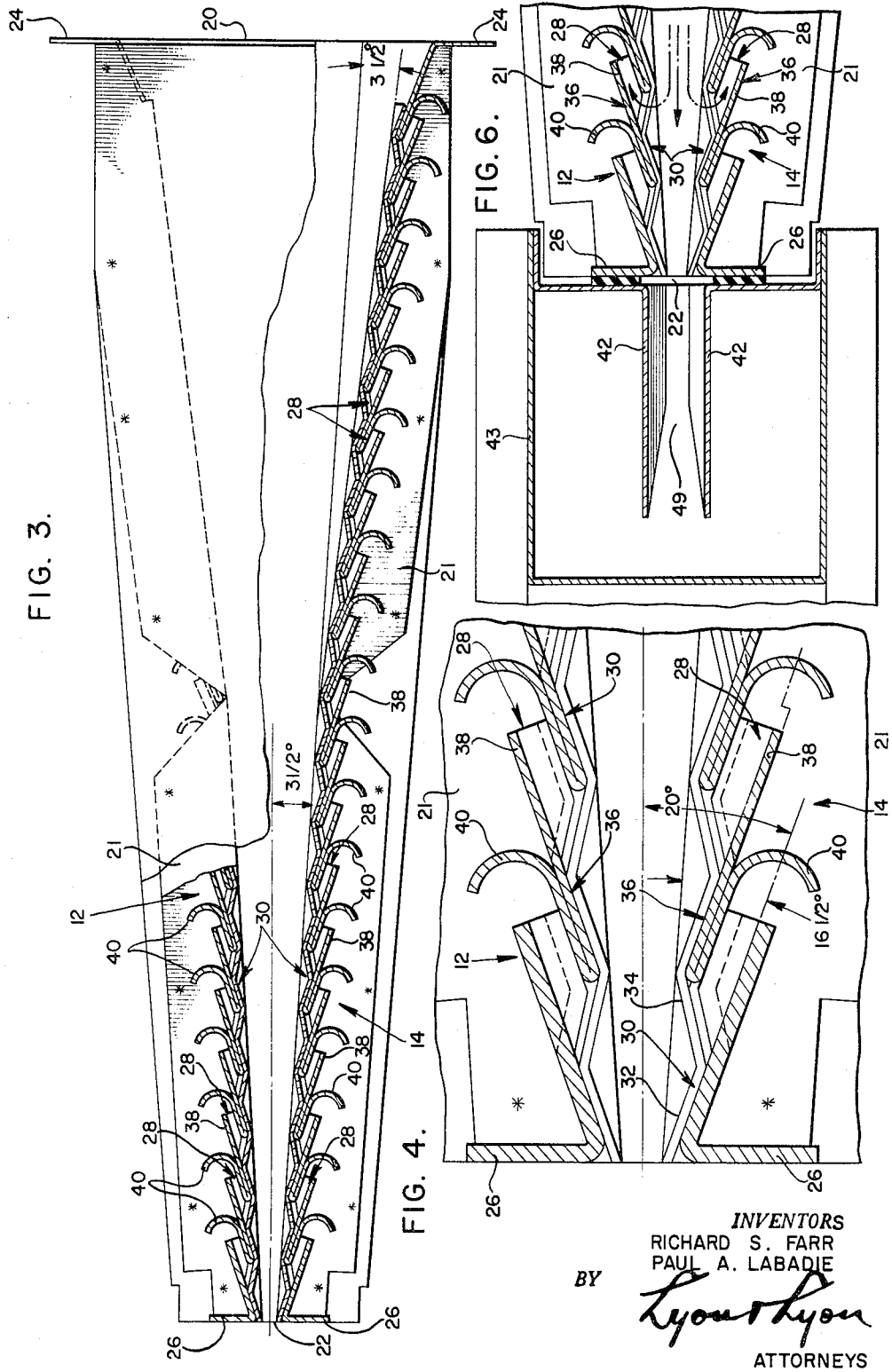

United States Patent Office 3,237,386
Patented Mar. 1, 1966

3,237,386
DUST SEPARATING DEVICE
Richard S. Farr, Los Angeles, and Paul A. Labadie, Torrance, Calif., assignors to Farr Company, Los Angeles, Calif., a corporation of California
Continuation of application Ser. No. 49,329, Aug. 12, 1960. This application Sept. 27, 1962, Ser. No. 226,705
5 Claims. (Cl. 55—443)

This application is a continuation of our earlier filed application Serial No. 49,329, filed August 12, 1960, and now abandoned. This invention relates to an improved dust separating device.

An object of this invention is to provide a separating device wherein particulate matter such as dust or the like, which is entrained in the entering fluid such as air, is separated from the fluid and concentrated for discharge.

It is a further object of this invention to provide a separating device wherein fluid having particles entrained therein is caused to change direction abruptly thus separating the particles as a result of their inertia.

It is a further object of this invention to provide an inertia separating device having a relatively high separating efficiency and a relatively low pressure loss.

It is still a further object of this invention to provide a separating device which will efficiently separate a high percentage of solid matter from its fluid while the device may be kept relatively small in size with a relatively small amount of pumping power required.

Still a further object of this invention is to provide a separating device wherein there is a uniform concentration of particulate matter in the effluent.

Still a further object of this invention is to provide such a separating device which may be operated in a confined area or in a bank or series of such devices in a confined area.

Still a further object of this invention is to provide a separating device wherein a portion of the air directed therethrough may be discharged to atmosphere or otherwise carrying off the particulate matter separated in said device.

Other objects and advantages will be readily apparent from the following description.

In the drawings:

FIGURE 2 is a view taken along line 2—2 of FIGURE 1.

FIGURE 3 is a view taken along line 3—3 of FIGURE 2.

FIGURE 4 is a fragmentary enlarged plan view of the exit end.

FIGURE 5 is a diagrammatic view of the discharge chute.

FIGURE 6 is a view taken along line 6—6 of FIGURE 2.

Figure 1:
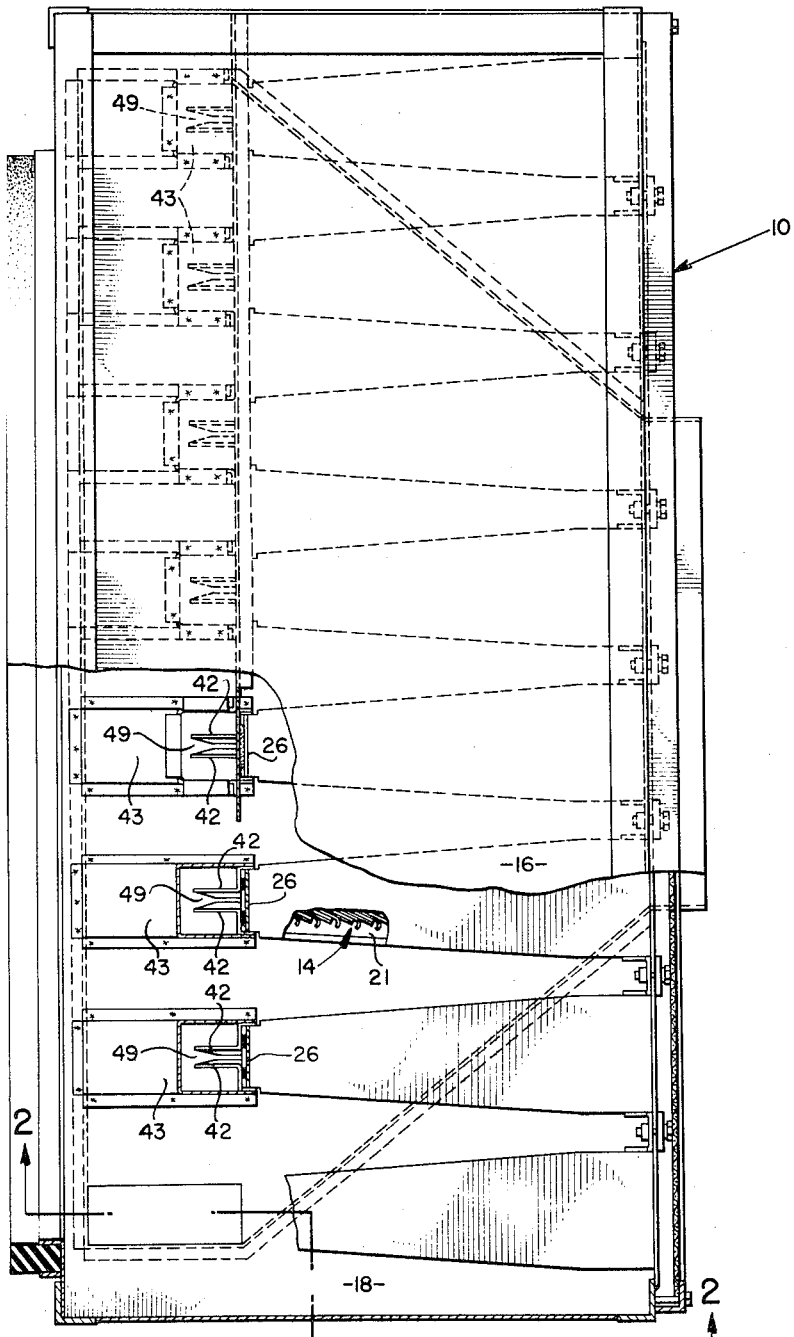
FIGURE 1 is a plan view of a separating device incorporating a bank of cells with certain parts of said device broken away.

The separating device herein described may be arranged in a parallel bank of cells or units in a single housing 10 having air inlets on one side and air outlets on the other side of the housing. Such an arrangement of parallel cells provides for matching the air or fluid handling capacity of the assembly with the requirements of each individual application without overloading a single cell. Since each cell is identical, the description hereafter will be of one of said cells.

The unit includes a pair of walls 12 and 14 converging toward the discharge end thereof and a pair of parallel plates 16 and 18. Each wall 12 and 14 has an outwardly bent flange such as 21 along the length of each edge thereof to which flange plates 16 and 18 are affixed such as by welding or the like thus forming an inlet opening 20 and a discharge opening 22. Each wall 12 and 14 and each plate 16 and 18 is provided with an outwardly projecting flange 24 adjacent inlet opening 20 providing means by which the filter may be secured in housing 10. The housing is provided with an opening contiguous with opening 20 to admit air into the filtering unit and a suitable screen may cover this opening to provide a preliminary filter.

The walls 12 and 14 and plates 16 and 18 are similarly provided with flanges 26 adjacent discharge opening 22 providing means for affixing the unit to dust bin 43.

As air enters the filter unit moved by a suitable blower or otherwise it enters the cell between converging walls 12 and 14 traveling in a straight path from opening 20 to discharge outlet 22. Since the space for said air is continuously reduced, the air tends to escape through outlets generally designated 28 formed in walls 12 and 14. A series of outlets 28 is arranged along the full length of each side wall, and same are identical in structure.

Each side wall is formed of a pair of metal strips forming flanges 21 each having projecting therefrom a leg 30. The legs generally designated 30 are bent as seen in FIGURE 4 to form a series of indentations, the faces of which designated 32 and 34 form angles of approximately 16½° with the longitudinal edge of flange 21. Secured at its ends to each face 32 by welding or otherwise is a flow-directing blade generally designated 36. The blades 36 in turn are disposed generally parallel and each is formed of a flat section 38 and has a curved or arcuate reversing vane 40 projecting laterally therefrom at approximately the mid-point thereof. Thus each flat section 38 forms with the next adjacent flow-directing blade an air outlet heretofore generally designated 28. Reversing vane 40 positioned in the path of air discharging through air outlet 28 acts to reverse the direction of said airflow and direct it generally in the same direction as the main airflow entering the cell. The flat section 38 extends approximately three times the space between adjacent blades so that the passage formed at outlet 28 is approximately three times as long as it is wide. Also the edge of blade 36 adjacent the entrance to outlet 28 is rounded to avoid pressure loss.

Thus as air enters the separating cell and tends to escape through outlets 28, the entrained particles in the entering airstream, because of their inertia, strike the inside surface of blades 36 and are deflected back into the entering airstream and so are largely prevented from passing through air outlet 28. The reversing vanes 40 change the direction of the air passing through outlets 28 and so prevent undesirable turbulence on the discharge side of the cell and so reduce resistance to airflow through the cell. That is, as the air passes through the outlets 28, if its direction is at an acute return angle to the direction of the entering main stream, considerable turbulence would result, particularly in the vicinity of the inlet opening 20. As seen in FIG. 1, adjacent cells are spaced closely together—as necessary to minimize space requirements. If the air passing through the outlet passages 28 of adjacent walls is directed in a backward direction, that is, to the right in FIG. 1, it tends to flow into a "dead" corner which substantially increases the overall resistance or pressure drop through the device. Further, the air passing through the outlet passages 28 of one wall of a cell will flow at an intersecting angle to the air passing through the adjacent wall, thereby causing turbulence and further increased resistance of the device. To avoid or minimize these effects, reversing vanes 40 are employed which cause the air through outlet passages 28 to flow substantially parallel to the direction of the entering main air stream. The reversing vanes are arcuate or curved rather than at a sharp angle so as to avoid any abrupt change in direction of flow of the air. Any such abrupt change would also set up turbulence and increase the overall resistance of the device to airflow.

Approximately 10% of the air entering the cell together with the separated particles is discharged through the discharge opening 22. In this embodiment an expanded passage 49, formed by members 42, fits over opening 22 and is enclosed by a duct or dust bin 43 which in this embodiment has its top sealed against airflow. Air and dust entering the duct 43 through opening 49 may be discharged from either or both ends of duct 43. In the embodiment illustrated duct 43 is tapered in cross-section and the small end of the tapered duct is closed to airflow while the large end opening into opening 44 allows for the discharge of the air and dust entering the duct 43. Opening 44 may connect with a further discharge duct such as 48 to carry the separated dust and particles way from the entering airstream. To maintain the necessary pressure differential between inlet 20 and the exit of discharge chute 48, and so insure the approximate 10% bleed airflow through opening 22, the flat plates of parts 42 are spaced apart a greater distance than the width of opening 22. The effect of this construction is to decelerate the air flowing through opening 22 and so convert some of the kinetic energy of flow into static pressure. This energy conversion appreciably increases the pressure in duct 43 and so tends to overcome the resistance in chute 48 and maintain the desired airflow through said chute 48. Further to obtain uniform airflow through passage 49 the members 42 are slightly diverging with their closest point adjacent opening 44. This construction tends to produce a uniform flow rate through opening 22.

The optimum cell configuration would employ side wall panels creating continuously varying angle of convergence for the side walls 12 and 14. Due to the separating action of the cell and the passage of cleaned air through openings 28, the dirt of particulate concentration in the air remaining increases as it flows from opening 20 to opening 22. Decreasing the angle of convergence as described above alters the efficiency of separation and maintains the cleanliness of the air passing through openings 28 near opening 22. However for simplicity and ease of manufacture in this embodiment each side wall is formed of two sections of approximately the same length. The sections adjacent inlet 20 have a convergence angle such as 14° while the sections adjacent outlet 22 have a convergence angle such as 7°. Due to the larger convergence angle the first half of the cell handles the greater amount of the air permitting a smaller convergence angle but higher efficiency in the second half of the cell wherein dirt concentration is the greatest.

While what hereinbefore has been described as the preferred embodiment of this invention, it is readily apparent that alterations and modifications may be resorted to without departing from the scope of this invention and such alterations and modifications are intended to be included within the scope of the appended claims.

We claim:
1. A device for separating entrained particulate matter from a fluid, said device comprising a pair of elongated converging walls having lateral edges, a pair of opposed plates extending along and connecting said wall edges, said plates and walls defining a converging flow passage having a longitudinal axis and having a fluid inlet at its divergent end and a particle-laden fluid outlet at its convergent end, said walls including a plurality of cleaned fluid outlets extending along the full length of each wall, said cleaned fluid outlets being defined between spaced apart parallel blades, said blades forming a larger acute angle with said axis than said walls, said blades formed of a flat planar section having a curved reversing vane projecting from the side of said flat section closest to the particle-laden fluid outlet at approximately the mid-point of said flat section and projecting laterally outward of said wall, the curved vane associated with each flat section being spaced apart from and in partly surrounding relation to the adjacent end of the next downstream flat section, the perpendicular distance of the outward terminal end of each curved vane from its associated flat section being substantially greater than the perpendicular distance between said associated flat section and said next downstream flat section, said curved vane and said adjacent end of said downstream flat section defining a curved passageway whereby escaping cleaned fluid is constrained to flow generally in the same direction as the entering stream of fluid.

2. The combination of claim 1 wherein said converging walls each include a metal strip forming a flange for connecting to said opposed plates, said flange having a leg projecting therefrom, said leg having a series of indentations with faces which are alternately disposed generally parallel to each other in generally zig-zag relation, and wherein said flat sections of said blades are attached at their edges to said alternate parallel faces.

3. The combination of claim 1 wherein the perpendicular distance between adjacent said flat sections of the blades is approximately one-half the perpendicular distance from a flat section to the outward terminal end of its associated curved reversing vane for the entire fluid escaping from said cleaned fluid outlets to be directed against only that portion of the arcuate reversing vane which curves away from said cleaned fluid outlets.

4. The combination of claim 1 wherein the outward terminal end of each flat section of a blade is more closely spaced apart from said curved reversing vane of the longitudinally upstream adjacent blade than from the curved reversing vane of the blade of that said outward terminal end for completely separating and spacing the fluid reversing of one vane from the next adjacent vane to minimize turbulence.

5. The combination of claim 1 wherein a pair of spaced plates extend from said convergent end of said walls and are spaced apart a perpendicular distance greater than the distance between said walls at said convergent end which forms said particle-laden fluid outlet, and an enlarged duct encloses said plates for receiving and conducting away the particle-laden fluid.

References Cited by the Examiner
UNITED STATES PATENTS

| | | | |
|---|---|---|---|
| 375,983 | 1/1888 | Boehning | 55—442 XR |
| 512,247 | 1/1894 | Gerard | 55—442 XR |
| 1,745,908 | 2/1930 | Paasche | 55—442 XR |
| 1,803,540 | 5/1931 | Taylor | 55—440 XR |
| 2,087,789 | 7/1937 | Allardice. | |
| 2,122,511 | 7/1938 | Bubar. | |
| 2,152,115 | 3/1939 | Van Tongeren. | |
| 2,182,862 | 12/1939 | Allardice. | |
| 2,357,734 | 9/1944 | Haber. | |

(Other references on following page)

UNITED STATES PATENTS

| | | | |
|---|---|---|---|
| 2,546,259 | 3/1951 | Fenn | 55—229 |
| 2,873,816 | 2/1959 | Umbricht et al. | 55—241 XR |
| 3,063,211 | 11/1962 | Orthies et al. | 55—229 |

FOREIGN PATENTS

| | | |
|---|---|---|
| 151,709 | 6/1953 | Australia. |
| 167,839 | 3/1951 | Austria. |
| 791,073 | 9/1935 | France. |
| 364,449 | 1/1932 | Great Britain. |
| 376,383 | 7/1932 | Great Britain. |
| 388,637 | 3/1933 | Great Britain. |
| 446,268 | 4/1936 | Great Britain. |
| 472,729 | 9/1937 | Great Britain. |
| 699,670 | 11/1953 | Great Britain. |
| 450,301 | 7/1949 | Italy. |
| 184,282 | 8/1936 | Switzerland. |

OTHER REFERENCES

Weib, K.: German Application 1,046,576, printed Dec. 18, 1958, K1. 12e 3–01.

HARRY B. THORNTON, *Primary Examiner.*

ROBERT E. BURNETT, *Examiner.*